United States Patent [19]

Röhm

[11] 4,332,186
[45] Jun. 1, 1982

[54] HYDRAULIC ACTUATOR FOR LATHE CHUCK

[76] Inventor: Günter H. Röhm, Heinrich-Röhm-Str. 50, 7927 Sontheim, Fed. Rep. of Germany

[21] Appl. No.: 208,772

[22] Filed: Nov. 20, 1980

[30] Foreign Application Priority Data

Nov. 21, 1979 [DE] Fed. Rep. of Germany ... 7932853[U]

[51] Int. Cl.³ .................... F01B 31/12; F15B 13/02; B23B 31/24
[52] U.S. Cl. .......................... 91/1; 91/420; 279/4
[58] Field of Search ............... 279/4, 1 C, 110, 111, 279/117, 118, 119, 120, 121; 92/106, 107, 108, 111, 112; 91/420, 1

[56] References Cited

U.S. PATENT DOCUMENTS

| | | | |
|---|---|---|---|
| 2,415,181 | 2/1947 | Johnson | 92/106 |
| 2,994,992 | 8/1961 | Thomson | 279/4 |
| 3,361,433 | 1/1968 | Holdridge | 279/4 |
| 3,369,464 | 2/1968 | Blattry | 279/4 X |
| 3,411,415 | 11/1968 | Benjamin et al. | 279/4 X |
| 3,599,535 | 8/1971 | Rohm | 279/4 X |
| 3,641,875 | 2/1972 | Kodalle | 91/1 |
| 3,855,902 | 12/1974 | Kirst | 279/4 X |
| 3,924,514 | 12/1975 | Parsons et al. | 91/420 |
| 4,200,300 | 4/1980 | Rohm | 279/121 X |

FOREIGN PATENT DOCUMENTS 2150041 10/1971 Fed. Rep. of Germany .......... 279/4
1316787 12/1962 France ........................ 91/1

Primary Examiner—William R. Briggs
Assistant Examiner—Paul M. Heyrana, Sr.
Attorney, Agent, or Firm—Karl F. Ross

[57] ABSTRACT

An actuator for a power chuck has a hollow actuator housing having a rearwardly extending housing tube that is centered on an axis and that has a closed rear end. This tube is formed with a pair of axially spaced and radially inwardly open grooves both having axial lengths equal at least to a predetermined axial distance, and the tube is further formed at these grooves with respective radially throughgoing apertures. A piston subdivides the interior of the housing into a pair of compartments and has a stem extending axially rearwardly in the tube. This piston is axially displaceable in the housing through an axial stroke at most as long as the distance corresponding to the axial lengths of the grooves. The piston is formed with a pair of throughgoing passages each having one end opening at the stem into a respective one of the grooves and another end opening into a respective one of the compartments. The piston is provided with a pair of check valves set up so as to prohibit flow between the ends of the passages except when either of the passages is pressurized from the respective one end. A collar surrounds this tube and is rotatable thereon about the axis. This collar is formed with a pair of angular inwardly open grooves respectively aligned with the apertures and is provided with a pair of connections respectively opening into the inwardly open grooves of the tube.

10 Claims, 1 Drawing Figure

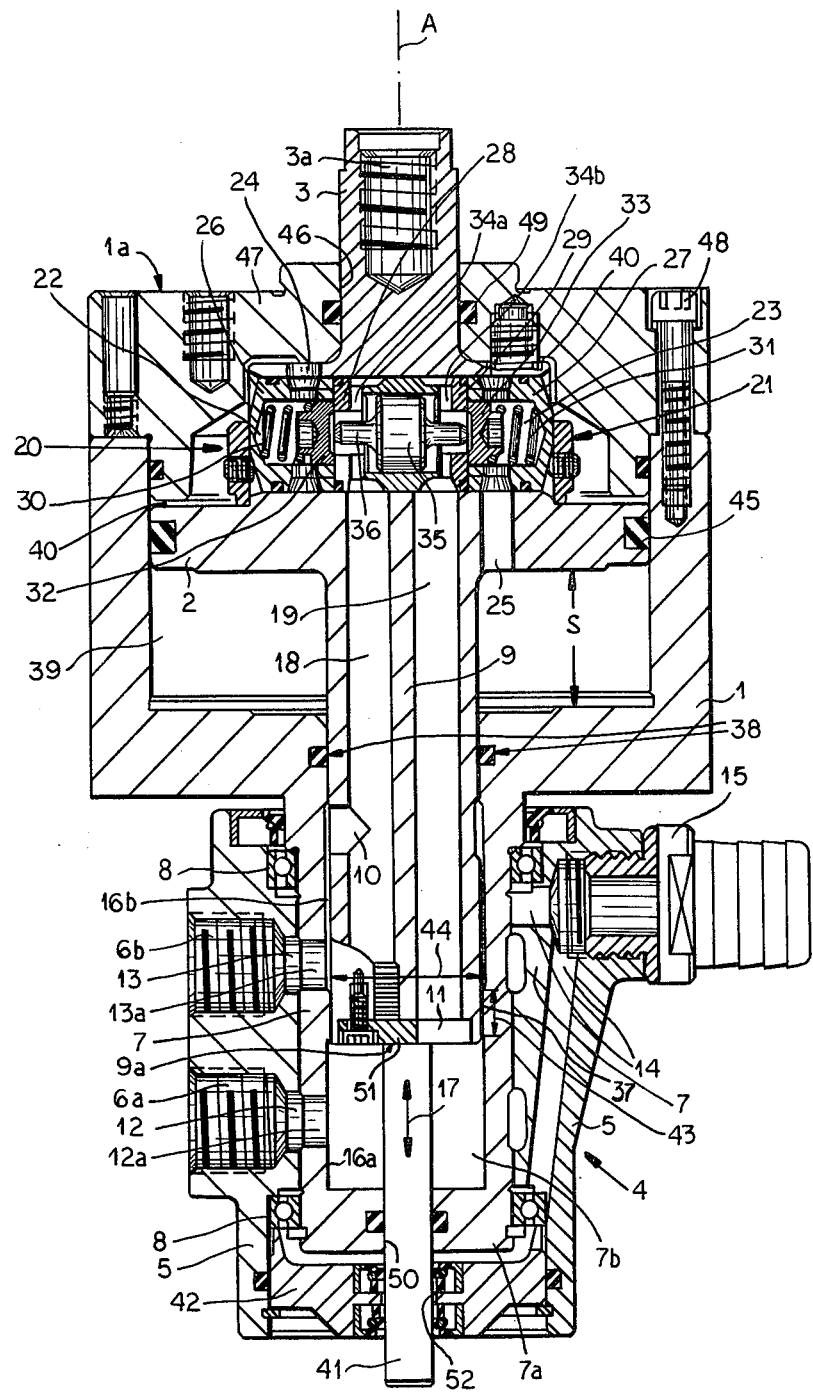

HYDRAULIC ACTUATOR FOR LATHE CHUCK

FIELD OF THE INVENTION

The present invention relates to an actuator for a lathe chuck. More particularly this invention concerns a hydraulic actuator for power chuck.

BACKGROUND OF THE INVENTION

A standard power chuck of the type described in my U.S. Pat. No. 4,200,300 or in my applications Ser. Nos. 040,126 and 159,654 respectively filed on July 24, 1979 and June 16, 1980 has a chuck body that is rotatable about a chuck axis and that is formed with a plurality of angularly spaced and radially extending front guides and a plurality of angularly spaced and radially extending rear guides. Respective front jaw parts are radially displaceable in the front guides and project forwardly axially from the chuck body and respective rear jaw parts are radially displaceable in the rear guides. Means is provided including at least one operating element that is engageable with the rear jaw parts for radially displacing same jointly in the chuck body and the respective rear guides. In addition respective coupling members are engageable between the rear jaw parts and the respective front jaw parts and are each displaceable into a coupling position engaging both of the respective parts for coupling same together for joint radial displacement and a decoupling position for relative radial displacement of the respective parts.

The operating element of such a split-jaw chuck is normally connected to an actuator that is normally powered hydraulically. This actuator may be mounted directly on the back of the chuck or may be provided at some axial distance from it, in the latter case connected to the operating element by means of an appropriate tube.

In U.S. Pat. No. 3,369,464 of J. Blattry such an arrangement is shown wherein the actuator has a double-acting piston subdividing the chamber of the actuator housing into a pair of compartments which can be alternately pressurized and depressurized to displace the piston and the operating element linked to it. The actuator housing has an axially centered rearwardly projecting extension on which is fitted a connection collar having two alternately pressurizable hydraulic or even pneumatic connections. This collar can rotate relative to the extension so that as the chuck and actuator turn the collar stands still. Passages extending between appropriate locations underneath the collar and the compartments are provided with respective check valves of the so-called double type which are set up so that if one of the passages is pressurized, automatically opening the respective check valve, the other check valve will open to release pressure from the other respective compartment. These check valves are provided on the back of the actuator housing so that the entire assembly has a considerable overall length.

Commonly owned U.S. Pat. No. 3,641,875 of R. Kodalle shows another such arrangement wherein the check valve assembly is provided directly in the piston. The piston has an axially rearwardly extending stem formed with the passages which open at radially spaced locations aligned with inwardly open grooves of a collar that moves axially with this stem. To this end the actuator housing has a rear wall formed with a throughgoing hole provided with a seal through which the piston stem extends. This arrangement has the advantage of considerable simplicity, but nonetheless has an excessive axial length that takes up valuable space on a lathe. What is more, leakage problems around the rearwardly projecting piston stem are considerable.

OBJECTS OF THE INVENTION

It is therefore an object of the present invention to provide an improved actuator for a power chuck.

Another object is to provide such an actuator which can be made substantially shorter than the known actuators.

SUMMARY OF THE INVENTION

These objects are attained according to the instant invention in an actuator of the above-described general type, but wherein the hollow actuator housing has a rearwardly extending housing tube centered on the axis and having a closed rear end. The tube is formed with a pair of axially spaced and radially inwardly open grooves both having axial lengths equal at least to a predetermined axial distance. The tube is further formed at these grooves with respective radially throughgoing apertures. The piston subdivides interior of the housing into a pair of compartments and has a stem extending axially rearwardly in the tube. This piston is axially displaceable in the housing through an axial stroke which is shorter or at most as long as the distance corresponding to the axial length of either of the grooves. This piston is formed with a pair of throughgoing passages each having one end opening at the stem into a respective one of the grooves and another end opening into a respective one of the compartments. A double check valve that prohibits flow between the ends of the passages except when either of the passages is pressurized from the respective one end is provided in the piston, according to the instant invention in the piston itself and not in its stem although mounting in the stem would be a possibility. A collar surrounds the tube and is rotatable thereon about the axis of the actuator. This collar is formed with a pair of inwardly open angular grooves respectively opening into the inwardly open grooves of the tube.

The system according to the instant invention can be made very small in spite of the mounting of the check valves on the piston or its stem in the provision of the flow passages in the piston and stem. The stem can be of relatively small diameter compared to the piston so that the housing tube can be also correspondingly small. The piston according to this invention is not rotatable relative to the housing so that sealing between the piston stem and the housing tube is relatively easy matter. In addition it is a relatively simple task to mount an indicator rod extending backwardly from this stem and out through a seal hole in the end wall of the housing tube, so that the exact position of the piston relative to the actuator housing, and therefore of the chuck jaws relative to the chuck body, can be read.

According to further features of this invention the one ends of the passage are spaced apart by a spacing at least equal to the above-described axial distance, that is by a spacing at least equal to the length of the grooves of the housing plus the spacing between them. In this manner it is possible to obtain even with a relatively shallow cut a large flow cross section so that a lower pressure can be employed than is normally possible. As a result the wall thicknesses of the structure can be somewhat reduced, again cutting production costs.

According to the instant invention the one end of one of the passages open axially rearwardly at the rear end of the piston stem. Since the rear end of the housing tube is closed, this means this one end opens into the chamber formed between the rear end of the stem and the rear end of the tube. Normally the chamber is angular, centered on the above-mentioned indicator rod which passes through a hole in the tube and wall. In such a construction the actuator housing, the tube extending from it, and the end wall of the tube are all made of a single unitary piece, thereby greatly reducing the possibility of leakage and cutting construction cost.

DESCRIPTION OF THE DRAWING

The sole FIGURE of the drawing is an axial section through an actuator according to the instant invention.

SPECIFIC DESCRIPTION

The actuator according to the instant invention is adapted to be used with a chuck of the type described in my above-cited patent and copending applications. It has an actuator housing 1 centered on a rotation axis A and having a front face 1a that may be bolted to the chuck body of the power chuck. A piston 2 provided with a seal 45 subdivides the interior of this actuator housing 1 into a rear compartment 39 and a forward compartment 40. A forwardly and axially projecting pin 3 formed unitarily with this piston 2 has a threaded bore 3a to which the operating element of power chuck bolted to the front face 1a is secured. This pin 3 extends out through a hole 46 in an end cap 47 of the actuator housing 1, with bolts 48 securing this end cap in place on the remainder of the housing 1 and a seal 49 being provided around the forwardly projecting pin or stem 3.

Unitarily formed with and projecting backwardly from the actuator housing 1 is a tube 7 having a closed rear end walls 7a formed with a throughgoing cylindrical hole 50 centered on the axis A. The piston 2 has a rearwardly extending cylindrical stem 9 projecting backwardly in this tube 7 and having a diameter 44 centered on the axis A. The stem 9 has a rear end 9a which is spaced axially from the inner surface of the rear wall 7a by a distance at least equal to the axial stroke S of the piston 2.

Rotatably carried by means of bearings 8 on the tube 7 is a distributor 4 comprising a collar 5 formed with a pair of radially open and axially spaced connections 6a and 6b that are threaded to receive standard hydraulic hoses. The bearings 8 permit the distributor assembly 4 to rotate about the axis A relative to the tube 7, but do not allow relative axial displacement. The connections 6a and 6b are associated with inwardly open grooves 12 and 13 that are aligned with radially throughgoing apertures 12a and 13a of the tube 7. The inner wall of the tube 7 is formed with inwardly open grooves 16a and 16b at the apertures 12a and 13a, which grooves 16a and 16b have axial lengths equal at least to the stroke S of the piston 2. These grooves 16a and 16b are spaced apart by a land 37 having an axial dimension 43 and a diameter equal to the diameter 44 so that the stem 9 of the piston completely prevents fluid flow between the grooves 16a and 16b. A seal prevents fluid flow between the groove 16b and the compartment 39.

The stem 9 is formed with a pair of axially extending passages 18 and 19. The passage 18 opens radially outwardly through a hole 10 into the groove 16b and the passage 19 opens through a hole 11 in an end plate 51 into the chamber 7b formed between the end 9a of the stem 9 and the inner surface of the end wall 7a. Thus, since the grooves 16a and 16b have axial lengths greater than the stroke S, fluid flow between the connections 6a and 6b and the respective inwardly open grooves 12 and 13 to the respective passages 19 and 18 will be insured at all times and in all axial positions of the piston 2.

A pair of passages 14 connected to a drain plug 15 open into the joint between the tube 7 and collar 5 at axially opposite ends thereof so that any leakage will be trapped and drained off via the drain fitting 15. The chuck is normally employed with the axis A horizontal and the drain 15 directed downwardly.

An indicator rod 41 centered on the axis A extends axially backwardly from the rear end surface 9a of the stem 9 out through the hole 50 and through another seal hole 52 in the end plate 42 of the collar 5. This indicator rod 41 normally carries a pointer that moves adjacent a fixed scale so that the operator of the machine can read to exactly what extent the jaws of the chuck operated by the actuator according to this invention are open or closed.

The other ends of the passages 18 and 19 open into respective compartments 34a and 34b flanking a pilot piston 35 having end pins 36 that can act on valve bodies 32 and 33 of check valves 20 and 21. These check valves 20 and 21 have respective cages 26 and 27 defining respective valve chambers 22 and 23 communicating via respective passages 24 and 25 with the chambers 40 and 39, respectively. The valve bodies 32 and 33 are urged against respective seats 28 and 29 by respective springs 30 and 31. This structure is therefore set up so that if neither of the passages 18 and 19 is pressurized the pilot piston 35 will remain in the central position and the two valves 20 and 21 will remain closed to prevent any lost of pressure from either of the chambers 39 or 40.

When the chuck is to be closed, which action normally is effected by pulling the operating element connected to the piston 2 back, the connection 6b is pressurized. This forces fluid through the groove 13 and hole 13a into the groove 16b where it passes through the hole 10 to the passage 18. The left-hand chamber 34a is then pressurized so as to push the pilot piston 35 toward the right and open the valve 21 and to push the valve body 32 to the left and allow the fluid under pressure to flow through the valve chamber 22 and passage 24 into the compartment 40. The pressurization of the compartment 40 will force the piston 2 back, with the fluid in the compartment 39 being able to pass via the passage 25 into the valve chamber 23 and past the pushed-back valve element 33 into the passage 19, where it passes through the compartment 7b, groove 16a, hole 12a, groove 12, and lower connection 6a.

Pressurization of the connection 6a will have the opposite effect, so that it is therefore possible to displace the piston 2 and operating element connected to it in either axial direction as indicated by the double-headed arrow 17.

During operation of the device the connections 6a and 6b are normally not pressurized so that the springs 30 and 31 push the respective valve members 32 and 33 into the closed position and center the piston 35, thereby preventing any leakage from the chambers 39 and 40. As there is no relative rotation between the piston 2 and housing 1, normally affected by forming a key way or the like in these members, sealing between them is relatively easy. Furthermore the pressurization and depressurization via the distributor fitting 4 having the collar 5 is normally also only carried out when the chuck is not rotating, so that leakage frankly not a problem with the system according to the instant invention. What minor leakage there is will be captured by the drain fitting 15.

I claim:

1. An actuator for a power chuck, said actuator comprising:
   - a hollow actuator housing having a rearwardly extending housing tube centered on an axis and having a closed rear end, said tube being formed with a pair of axially spaced and radially inwardly open grooves both having axial lengths equal at least to a predetermined axial distance, said tube further being formed at said grooves with respective radially throughgoing apertures;
   - a piston subdividing the interior of said housing into a pair of compartments and having a stem extending axially rearwardly in said tube, said piston being axially displaceable in said housing through an axial stroke at most as long as said distance, said piston being formed with a pair of throughgoing passages each having one end opening at said stem into a respective one of said grooves and another end opening into a respective one of said compartments;
   - means in said piston including a pair of check valves in said passages for prohibiting flow between said ends of said passages except when either of said passages is pressurized from the respective one end; and
   - a collar surrounding said tube and rotatable thereon about said axis, said collar being formed with a pair of annular inwardly open grooves respectively aligned with said apertures and being provided with a pair of connections respectively opening into said inwardly open grooves of said tube.

2. The actuator defined in claim 1 wherein said radially inwardly open grooves are annular.

3. The actuator defined in claim 1 wherein said connections and apertures are spaced axially apart at least by said distance.

4. The actuator defined in claim 1 wherein the one end of one of said passages opens axially rearwardly on said stem.

5. The actuator defined in claim 4 wherein said piston is provided with an axially rearwardly projecting indicator rod, said closed rear end being formed with a throughgoing hole through which said rod passes.

6. The actuator defined in claim 1 wherein said housing, tube, and rear end are unitary.

7. The actuator defined in claim 1, further comprising seal means between said piston and said housing, both between said inwardly open grooves and between said inwardly open grooves and said compartments.

8. The actuator defined in claim 1 wherein said check valves are carried on said piston.

9. The actuator defined in claim 1 wherein said passages extend at least partially axially through said stem.

10. The actuator defined in claim 1 wherein said piston is nonrotatable about said axis relative to said housing.

* * * * *